United States Patent [19]

Shizuya

[11] Patent Number: 5,096,299
[45] Date of Patent: Mar. 17, 1992

[54] PATTERN AREA RATIO MEASURING APPARATUS

[75] Inventor: Fumio Shizuya, Saitama, Japan

[73] Assignee: Komori Corporation, Tokyo, Japan

[21] Appl. No.: 528,766

[22] Filed: May 24, 1990

[30] Foreign Application Priority Data

May 26, 1989 [JP] Japan .................. 1-60402[U]

[51] Int. Cl.⁵ .......................................... G01B 11/28
[52] U.S. Cl. ................... 356/379; 356/380; 356/446
[58] Field of Search .............. 356/379, 380, 445, 446, 356/394, 429, 444, 430, 448; 358/101, 106, 107; 250/559

[56] References Cited

U.S. PATENT DOCUMENTS

| | | | |
|---|---|---|---|
| 2,720,812 | 10/1955 | Middleton | 356/446 |
| 3,609,044 | 9/1971 | Murphy | 356/446 |
| 3,792,268 | 2/1974 | Bjerke et al. | 356/446 |
| 4,512,662 | 4/1985 | Tobias | 356/380 |
| 4,681,455 | 7/1987 | Jeschke et al. | 356/380 |

Primary Examiner—Richard A. Rosenberger
Assistant Examiner—Hoa Pham
Attorney, Agent, or Firm—Remy J. VanOphem

[57] ABSTRACT

A pattern area ratio measuring apparatus includes a diffusing unit. The diffusing unit is arranged before light sources and irregularly reflects radiation light to a plate to be measured.

2 Claims, 6 Drawing Sheets

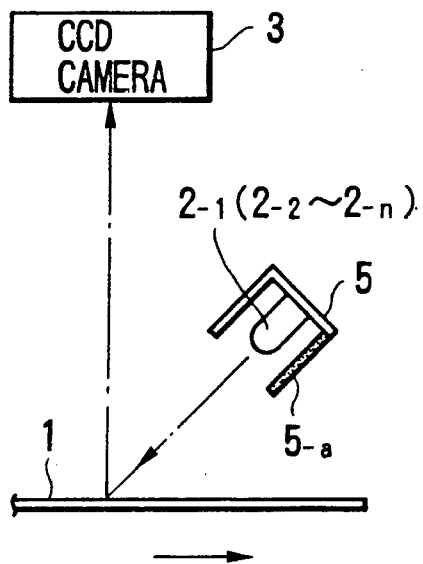
F I G. 3A
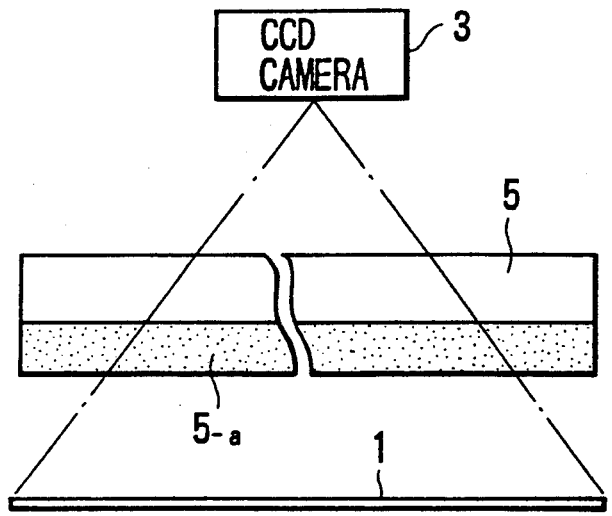
F I G. 3B
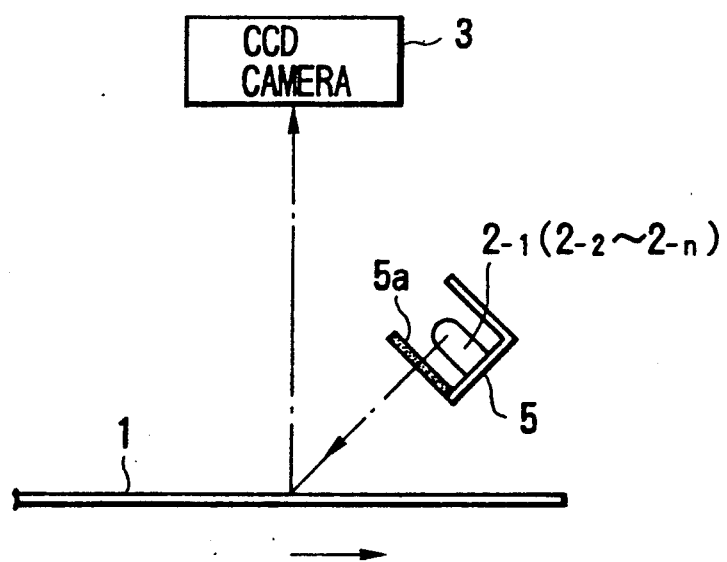
F I G. 4

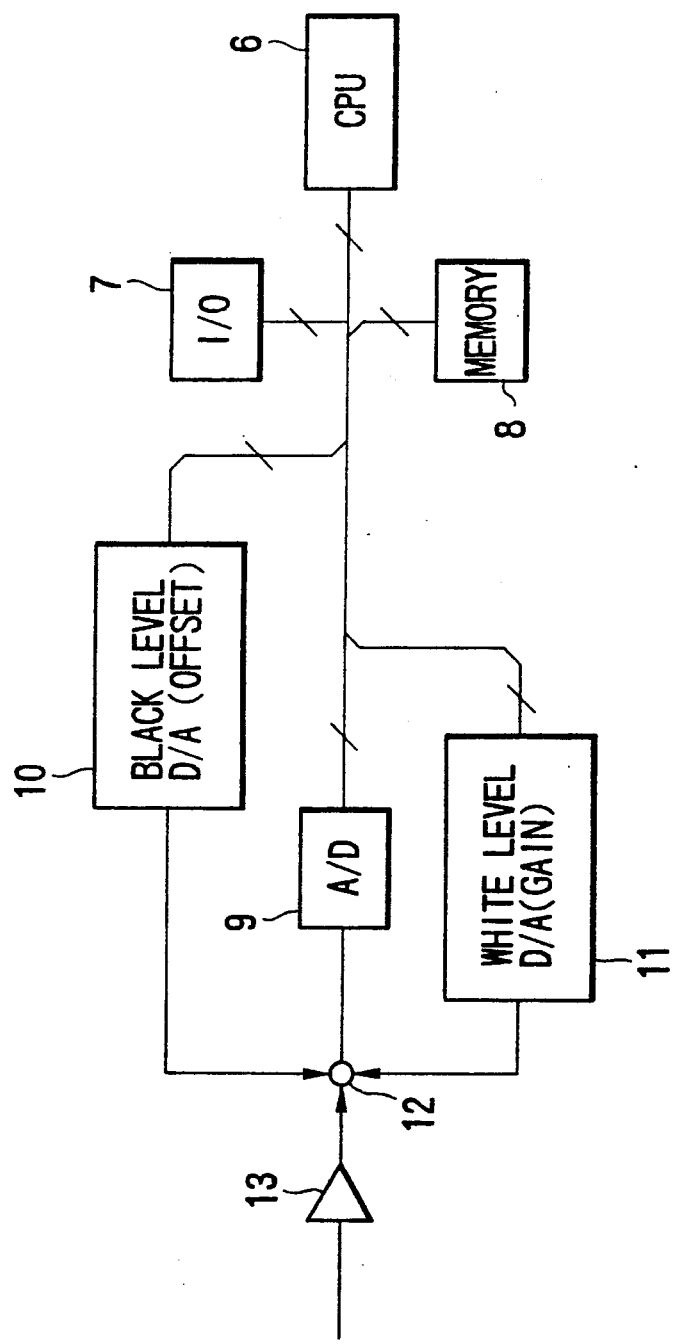
F I G. 5

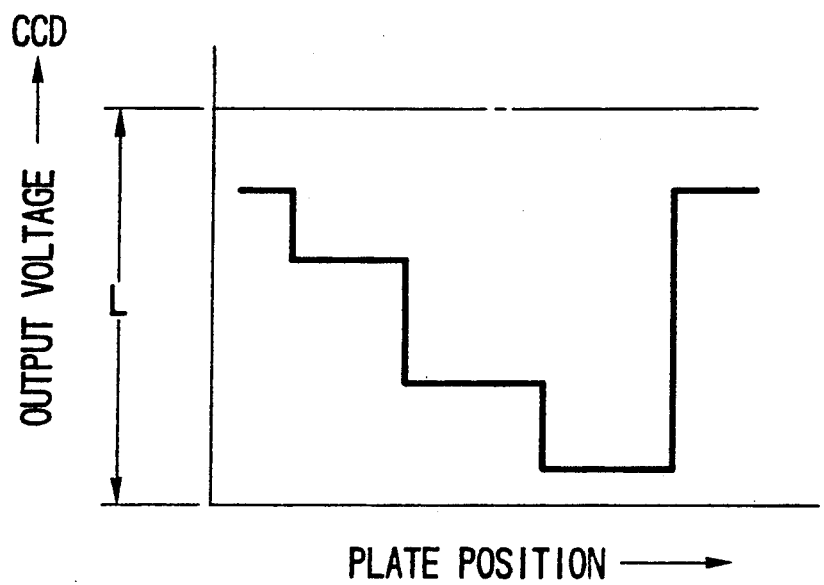
FIG.8A
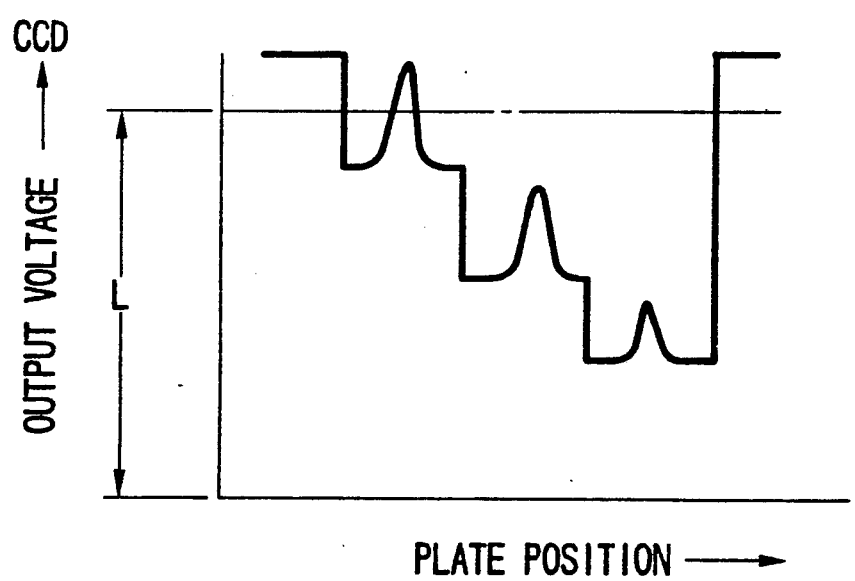
PRIOR ART  FIG.8B

PATTERN AREA RATIO MEASURING APPARATUS

BACKGROUND OF THE INVENTION

The present invention relates to a pattern area ratio measuring apparatus for measuring an area ratio of a pattern drawn on a plate or lithographic printing plate to be measured.

A conventional pattern area ratio measuring apparatus of this type is comprised of a plurality of parallel light sources and radiates light from these light sources onto a plate to be measured, thereby measuring an area ratio of a pattern drawn on the plate to be measured on the basis of light reflected by the plate to be measured.

FIGS. 9A and 9B show a structure of a conventional pattern area ratio measuring apparatus. Referring to FIGS. 9A and 9B, reference numeral 1 denotes a plate to be measured; 2-1 to 2-n, light sources (halogen lamps) arranged parallel to each other in the widthwise direction of the plate 1 to be measured with intervals of several cm therebetween; and 3, a CCD camera.

In the pattern area ratio measuring apparatus having the above arrangement, light from the halogen lamps 2-1 to 2-n is radiated onto the plate 1 to be measured, and light reflected by the plate 1 to be measured is incident on the CCD camera 3. An area ratio of a pattern drawn on the plate 1 to be measured is measured on the basis of an output voltage from the CCD camera 3 generated in correspondence with the input reflected light.

The above conventional pattern area ratio measuring apparatus can measure a pattern area ratio without any trouble provided that a presensitized plate (to be referred to as a PS plate hereinafter) is used as the plate 1 to be measured. If, however, a waterless plate is used as the plate 1 to be measured, a pattern area ratio cannot be correctly measured by this apparatus.

That is, since the surface of a PS plate is grained, light is irregularly reflected and uniformized by the surface, and this uniformized light is incident as reflected light on the CCD camera 3. Therefore, a pattern area ratio of such a PS plate can be correctly measured. However, since the surface of a waterless plate is mirror-finished, its reflectivity is much higher than that of the PS plate. For this reason, the intensity of light reflected by a portion around an intersection with respect to each of optical axes $L_1$ to $L_n$ of the halogen lamps 2-1 to 2-n is increased, and an output voltage value from the CCD camera 3 corresponding to the portion exceeds an upper voltage limit $V_{UP}$, as shown in FIG. 10. As a result, a pattern area ratio different from an actual pattern area ratio is measured.

SUMMARY OF THE INVENTION

The present invention has been made in consideration of the above situation and has as its object to provide a pattern area ratio measuring apparatus which can measure a pattern area ratio of a plate having a mirror-finished surface such as a waterless plate with substantially the same precision as that obtained by using a PS plate.

According to a first aspect of the present invention, there is provided a pattern area ratio measuring apparatus which includes a plurality of parallel light sources and radiates light from the light sources onto a plate to be measured, thereby measuring an area ratio of a pattern drawn on the plate to be measured on the basis of light reflected by the plate to be measured, having diffusing means, arranged before the light sources, for irregularly reflecting radiation light to the plate to be measured.

According to a second aspect of the present invention, there is provided a pattern area ratio measuring apparatus which includes a plurality of parallel light sources and radiates light from the light sources onto a plate to be measured, thereby measuring an area ratio of a pattern drawn on the plate to be measured, having diffusing means for switching the light sources between first and second positions and irregularly reflecting radiation light to the plate to be measured when the light sources are switched to the second switching position.

According to a third aspect of the present invention, there is provided a pattern area ratio measuring apparatus which includes a plurality of parallel light sources and radiates light from the light sources onto a plate to be measured, thereby measuring an area ratio of a pattern drawn on the plate to be measured on the basis of a voltage value corresponding to light reflected by the plate to be measured, having diffusing means, arranged before the light sources, for irregularly reflecting radiation light to the plate to be measured, first voltage adjusting means for adjusting a voltage value corresponding to a black level of the plate to be measured to a predetermined value Va, and second voltage adjusting means for adjusting a voltage value corresponding to light reflected by a white level of the plate to be measured to a predetermined value Vb.

According to the first aspect of the present invention, light from the light sources is irregularly reflected through the diffusing means and radiated on the plate to be measured.

According to the second aspect of the present invention, by switching the light sources to a predetermined switching position, light from the light sources is irregularly reflected through the diffusing means and radiated on the plate to be measured.

According to the third aspect of the present invention, light from the light sources is irregularly reflected through the diffusing means and radiated onto the plate to be measured, and a voltage value corresponding to light reflected by the plate to be measured is adjusted to change between the predetermined values Va and Vb.

BRIEF DESCRIPTION OF THE DRAWINGS

FIGS. 3A and 3B are side and front views, respectively, showing another embodiment of the pattern area ratio measuring apparatus;

FIG. 4 is a side view showing a switching angular position of a cover member formed integrally with halogen lamps of the pattern area ratio measuring apparatus shown in FIGS. 3A and 3B;

FIG. 5 is a block diagram showing a processor for receiving an output voltage from a CCD camera of still another embodiment of the pattern area ratio measuring apparatus;

FIGS. 8A and 8B are graphs showing output voltage values of CCD cameras upon pattern area ratio measurement for a PS plate and a waterless plate according to the present invention and a conventional apparatus;

DETAILED DESCRIPTION OF THE PREFERRED EMBODIMENT

A pattern area ratio measuring apparatus according to the present invention will be described in detail below with reference to the accompanying drawings.

Figure 1A:
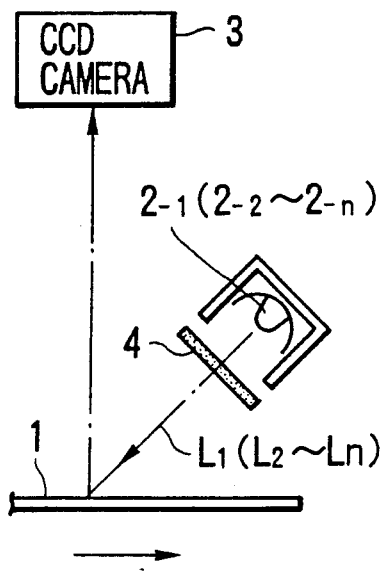
FIGS. 1A and 1B are side and front views, respectively, showing an embodiment of a pattern area ratio measuring apparatus according to the present invention.
Figure 1B:
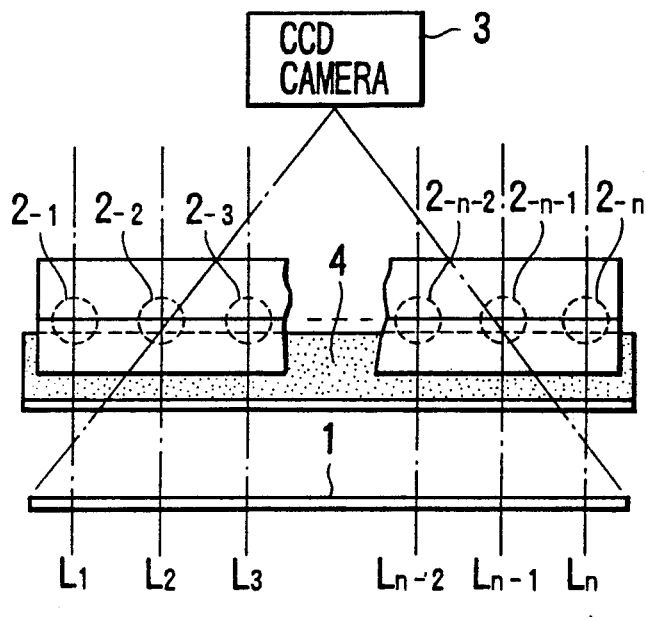
Figure 9A:
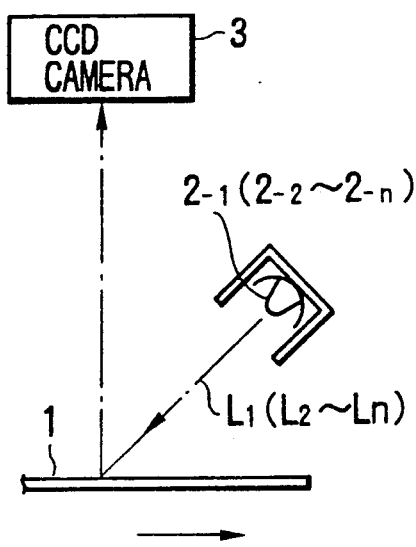
FIGS. 9A and 9B are side and front views, respectively, showing a structure of a conventional pattern area ratio measuring apparatus.
Figure 9B:
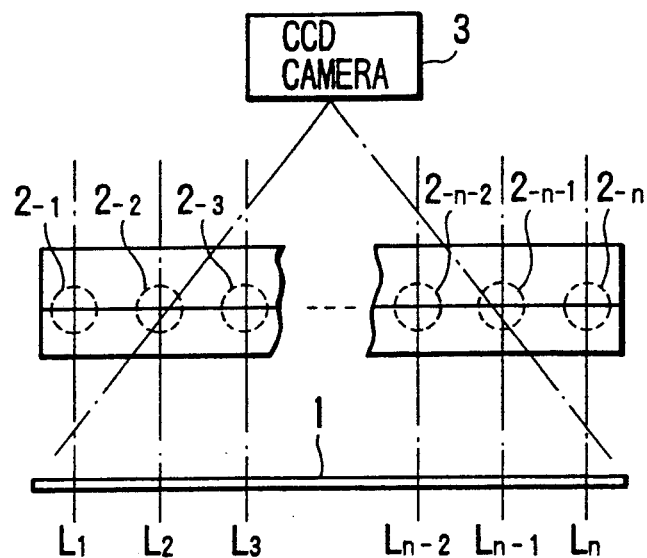
Figure 10:
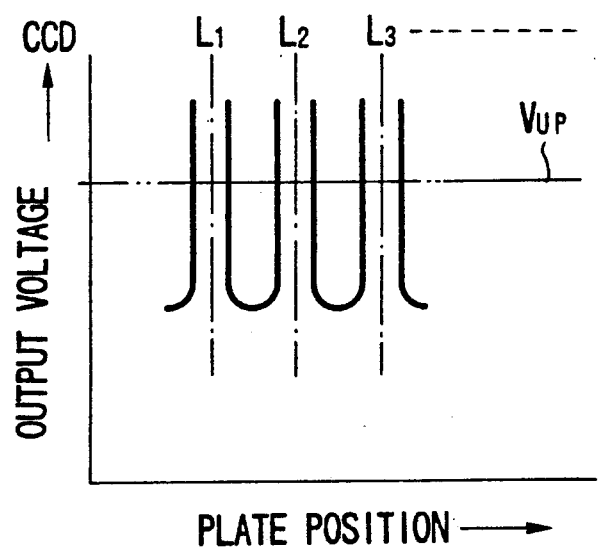
FIG. 10 is a graph showing an output voltage value from a CCD camera of the conventional pattern area ratio measuring apparatus shown in FIGS. 9A and 9B obtained when a waterless plate is used as a plate to be measured.

FIGS. 1A and 1B show an embodiment of a pattern area ratio measuring apparatus according to the present invention. The pattern area ratio measuring apparatus shown in FIGS. 1A and 1B corresponds to the first aspect of the present invention. In FIGS. 1A and 1B, the same reference numerals as in FIGS. 9A and 9B denote the same parts and a detailed description thereof will be omitted.

In this embodiment, a diffusing plate 4 is arranged before halogen lamps 2-1 to 2-n. This diffusing plate 4 consists of a semitransparent plate.

Figure 2:
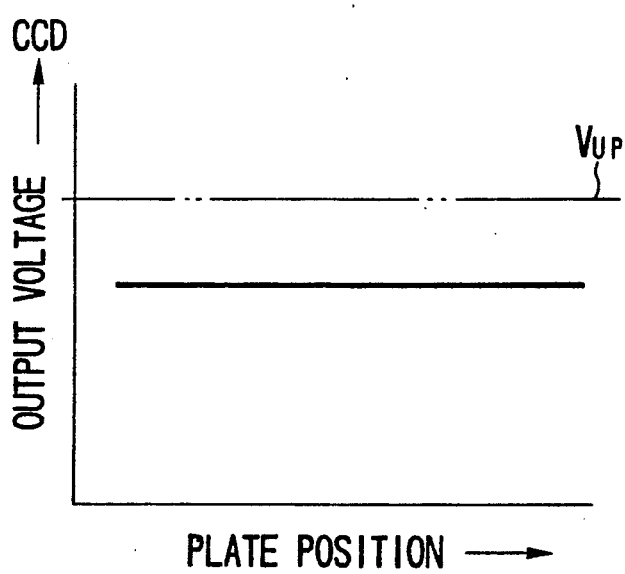
FIG. 2 is a graph showing an output voltage value from a CCD camera of the pattern area ratio measuring apparatus shown in FIGS. 1A and 1B obtained when a waterless plate is used as a plate to be measured.

In the pattern area ratio measuring apparatus having the above arrangement, light from the halogen lamps 2-1 to 2-n is radiated onto a plate 1 to be measured through the diffusing plate 4, and light reflected by the plate 1 to be measured is incident on a CCD camera 3. That is, the light from the halogen lamps 2-1 to 2-n is irregularly reflected and uniformized through the diffusing plate 4 and radiated onto the plate 1 to be measured. If a waterless plate is used as the plate 1 to be measured, light irregularly reflected and uniformized through the diffusing plate 4 is radiated onto the surface of the waterless plate. Therefore, a conventional problem of an increase in intensity of light reflected by a portion around an intersection with respect to each of optical axes L-1 to L-n of the halogen lamps 2-1 to 2-n can be solved. Therefore, as shown in FIG. 2, since an output voltage value from the CCD camera 3 changes in a region below its upper voltage limit $V_{UP}$, a pattern area ratio can be correctly measured on the basis of the output voltage value from the CCD camera 3. That is, by properly selecting the diffusing plate 4, substantially the same precision as that obtained by using a PS plate can be obtained by using a waterless plate.

FIGS. 3A and 3B show another embodiment of the pattern area ratio measuring apparatus corresponding to the second aspect of the present invention.

In this embodiment, a diffusing portion 5-a consisting of a semitransparent member is provided to a cover member 5 of halogen lamps 2-1 to 2-n. By rotating the cover member 5 formed integrally with the halogen lamps 2-1 to 2-n clockwise through 90°, its angular position can be switched from that shown in FIG. 3A to that shown in FIG. 4.

In the pattern area ratio measuring apparatus having the above arrangement, if a PS plate is used as a plate 1 to be measured, an angular position of the cover member 5 formed integrally with the halogen lamps 2-1 to 2-n is normally set as shown in FIG. 3A. That is, when the cover member 5 is located in the normal angular position, light from the halogen lamps 2-1 to 2-n is directly radiated onto the plate (PS plate) 1 to be measured, and light reflected by the plate 1 to be measured is incident on a CCD camera 3.

When a waterless plate is used as the plate 1 to be measured, the cover member 5 formed integrally with the halogen lamps 2-1 to 2-n is rotated clockwise through 90°. That is, the cover member 5 is switched to the angular position shown in FIG. 4. When the cover member 5 is switched to the angular position shown in FIG. 4, light from the halogen lamps 2-1 to 2-n is irregularly reflected and uniformized through the diffusing portion 5a and radiated on the surface of the plate (waterless plate) 1 to be measured, and light reflected by the plate 1 to be measured is incident on the CCD camera 3. As a result, the same effect and result as obtained by the apparatus shown in FIGS. 1A and 1B can be obtained.

Still another embodiment corresponding to the third aspect of the present invention will be described below. FIG. 5 shows a processor for receiving an output voltage from a CCD camera 3, which has a CPU 6 as a control unit using a microprocessor or the like, an I/O port 7, a memory 8, an A/D converter 9, a black level D/A converter 10, a white level D/A converter 11, a subtractor 12, and an amplifier 13. That is, an output voltage (analog value) from the CCD camera 3 is supplied to the A/D converter 9 via the amplifier 13 and the subtractor 12. The supplied voltage is converted into a digital value by the A/D converter 9 and supplied to the CPU 6. The CPU 6 calculates a pattern area ratio of a plate 1 to be measured on the basis of the digital value supplied from the A/D converter 9. On the basis of a digital value supplied upon measurement of a black level of a waterless plate to be described later, the CPU 6 supplies a feedback value (digital value) to the black level D/A converter 10 so that a voltage to be supplied to the A/D converter 9 is adjusted to a predetermined value Va, thereby executing measurement of a pattern area ratio. On the basis of a digital value supplied upon measurement of a white level on a waterless plate to be described later, the CPU 6 supplies a feedback value (digital value) to the white level D/A converter 11 so that a voltage to be supplied to the A/D converter 9 is adjusted to a predetermined value Vb, thereby executing measurement of a pattern area ratio.

Figure 7:
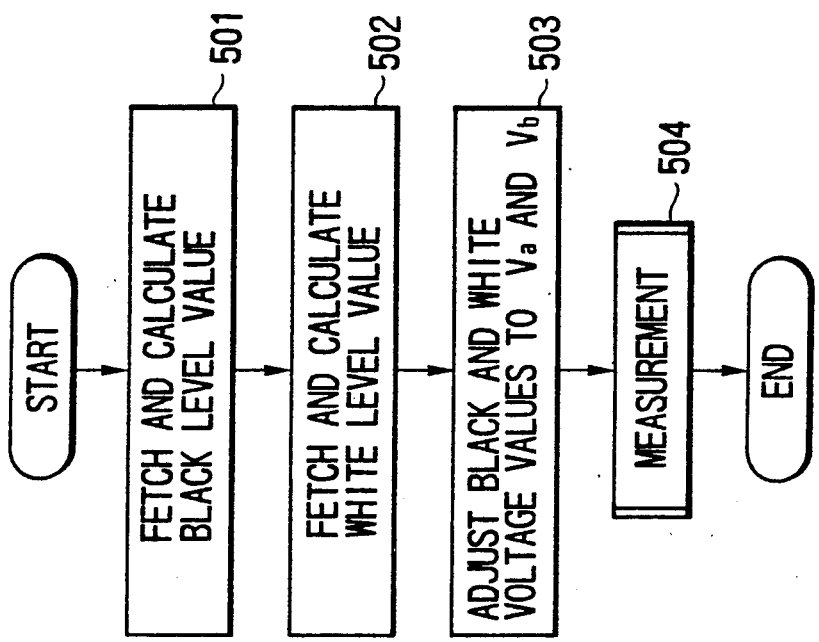
FIG. 7 is a flow chart for explaining an operation of the pattern area ratio measuring apparatus shown in FIG. 5.
Figure 6:
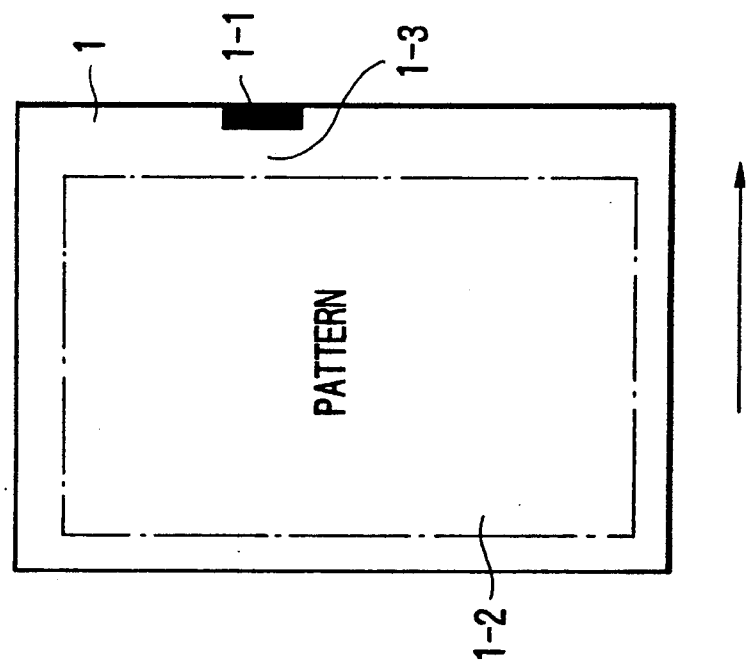
FIG. 6 is a plan view showing a black level adhered on the peripheral surface of a waterless plate.

When a waterless plate is used as the plate 1 to be measured, a black level 1-1 is adhered on the peripheral surface of the waterless plate 1 (FIG. 6). Assume that when measurement of a pattern area ratio is started, light reflected by the black level 1-1 is initially incident on the CCD camera 3. The black level 1-1 is defined as a darkest portion of a pattern 1-2 drawn on the waterless plate 1. Therefore, when pattern area ratio measurement is started in the processor shown in FIG. 5, an output voltage corresponding to light reflected by the black level 1-1 is initially supplied to the A/D converter 9 via the amplifier 13 and the subtractor 12. This supplied voltage is converted into a digital value by the A/D converter 9 and supplied to the CPU 6. The CPU 6 calculates a voltage to be supplied to the A/D converter 9 as a black level voltage value on the basis of the input digital value (black level value) (step 501 in FIG. 7). As the waterless plate 1 is moved, light reflected by a blank portion 1-3 between the black level 1-1 and the pattern 1-2 is incident on the CCD camera 3. In this embodiment, this blank portion 1-3 is defined as a white level corresponding to a brightest portion of the pattern 1-2. An output voltage value corresponding to light reflected by the white level 1-3 is supplied to the A/D converter 9 via the amplifier 13 and the subtractor 12. This supplied voltage is converted into a digital value by the A/D converter 9 and supplied to the CPU 6. The CPU 6 calculates a voltage to be supplied to the A/D converter 9 as a white level voltage value on the basis of the input digital value (white level value) (step 502). The CPU 6 supplies the feedback values to the black and white level D/A converters 10 and 11 so that the black and white level voltage values are adjusted to the predetermined values Va and Vb, respectively (step 503), and executes measurement of the pattern area ratio (step 504).

Referring to FIG. 8A, assuming that the output voltage value is the voltage value to be supplied to the A/D converter 9, the predetermined values Va and Vb with respect to the black and white level voltage values can be respectively defined as lower and upper limits for changing the voltage to be supplied within a measurement range L. The feedback value supplied to the subtractor 12 via the black level D/A converter 10 is supplied to perform offset adjustment of the voltage value to be supplied to the A/D converter 9. The feedback value supplied to the subtractor 12 via the white level D/A converter 11 is supplied to perform gain adjustment of the voltage value to be supplied to the A/D converter 9.

FIG. 8B shows a result obtained by a conventional apparatus not using the present invention. Referring to FIG. 8B, an output voltage value from the CCD camera 3 is increased as a whole to fall outside the measurement range L. In addition, an output voltage value from the CCD camera 3 corresponding to a portion on a plate surface around an intersection with respect to an optical axis of each halogen lamp sharply increases due to intense light reflected by the portion. In this embodiment, however, as shown in FIG. 8A, light is irregularly reflected and uniformized through the diffusing plate 4 and radiated onto the surface of the plate 1. Therefore, an increase in intensity of light reflected by the portion around an intersection with respect to an optical axis of each halogen lamp can be prevented to eliminate a sharp increase in the voltage value to be supplied to the A/D converter 9. In addition, since the feedback values are supplied to the subtractor 12 via the black and white level D/A converters 10 and 11, an offset and a gain of the voltage value to be supplied to the A/D converter 9 can be adjusted to allow this supplied voltage value to change within the measurement range L. Therefore, measurement of a pattern area ratio can be correctly performed on the basis of the voltage value to be supplied to the A/D converter 9. That is, by properly selecting the diffusing plate 4 and properly determining the predetermined values Va and Vb for the black and white level voltage values, respectively, substantially the same measurement precision as that obtained by a PS plate can be obtained by a waterless plate.

The techniques according to the embodiments of the present invention can be applied to precisely measure a pattern area ratio of a plate having lower reflectivity than that of a PS plate by partially changing circuit constants or programs without adjusting hardware.

In each of the above embodiments, a waterless plate is used as the plate 1 to be measured having high reflectivity. However, the plate 1 to be measured is not limited to a waterless plate. That is, the present invention can be used to measure pattern area ratios of various types of plates having mirror-finished surfaces such as a waterless plate, resulting in a very wide application.

As has been described above, according to the pattern area ratio measuring apparatus of the present invention, the diffusing means for irregularly reflecting radiation light to a plate to be measured is arranged before light sources. Therefore, light from the light sources is irregularly reflected and radiated onto the plate to be measured.

In addition, the pattern area ratio measuring apparatus includes diffusing means for irregularly reflecting radiation light to a plate to be measured in its predetermined switching position. Therefore, by switching the diffusing means to the predetermined switching position, light from light sources is irregularly reflected and radiated onto the plate to be measured. Therefore, by properly selecting the diffusing means, a pattern area ratio of a plate having a mirror-finished surface such as a waterless plate can be measured with substantially the same precision as that obtained by using a PS plate.

Furthermore, the pattern area ratio measuring apparatus has first voltage adjusting means for adjusting a voltage value corresponding to light reflected by a black level of a plate to be measured to a predetermined value Va, and second voltage adjusting means for adjusting a voltage value corresponding to light reflected by a white level of the plate to be measured to a predetermined value Vb. Therefore, light from light sources is irregularly reflected by a diffusing means and radiated onto the plate to be measured, and a voltage value corresponding to light reflected by the plate to be measured can be changed between the predetermined values Va and Vb. Therefore, by properly selecting the diffusing means and properly setting the predetermined values Va and Vb, a pattern area ratio of a plate having a mirror-finished surface such as a waterless plate can be measured with substantially the same precision as that obtained by using a PS plate.

What is claimed is:

1. A pattern area ratio measuring apparatus having at least one light source which radiates light along a light path onto a plate to be measured, said plate reflecting said light for purposes of measuring an area ratio of a pattern drawn on said plate, said pattern area ratio measuring apparatus comprising:

sensor means for receiving said light reflected from said plate, said sensor means measuring said area ratio of said pattern drawn on said plate on the basis of a voltage value corresponding to said light reflected by said plate;

diffusing means disposed between said at least one light source and said plate for diffusing said light radiated onto said plate; and switching means for switching said diffusing means between a first position and a second position, said diffusing means being positioned in said light path to diffuse said light prior to said light impinging upon said plate when said diffusing means is in one of said first or second positions, said diffusing means being positioned outside said light path such that said light does not pass through said diffusing means prior to impinging upon said plate when said diffusing means is in the other of said first or second positions.

2. The pattern area ratio measuring apparatus according to claim 1 further comprising:

first voltage adjusting means for adjusting a first voltage value corresponding to light reflected by a black level of said plate to a first predetermined value; and second voltage adjusting means for adjusting a second voltage value corresponding to light reflected by a white level of said plate to a second predetermined value.

* * * * *